US00RE40660E

(19) United States
(12) Reissued Patent
Primrose

(10) Patent Number: US RE40,660 E
(45) Date of Reissued Patent: Mar. 10, 2009

(54) CONFIGURABLE GLUELESS MICROPROCESSOR INTERFACE

(76) Inventor: Donald R. Primrose, 16521 NW. Brandberry Dr., Portland, OR (US) 97229

(21) Appl. No.: 11/652,469

(22) Filed: Jan. 10, 2007

Related U.S. Patent Documents

Reissue of:
(64) Patent No.: 6,842,816
Issued: Jan. 11, 2005
Appl. No.: 09/920,246
Filed: Jul. 31, 2001

(51) Int. Cl.
*G06F 13/00* (2006.01)

(52) U.S. Cl. ..... 710/305; 710/315

(58) Field of Classification Search ..... 710/305, 710/306, 315, 316

See application file for complete search history.

(56) References Cited

U.S. PATENT DOCUMENTS

| | | | | | |
|---|---|---|---|---|---|
| 4,935,894 | A | * | 6/1990 | Ternes et al. | 710/310 |
| 4,967,346 | A | * | 10/1990 | Freidin | 710/305 |
| 5,305,317 | A | * | 4/1994 | Szczepanek | 370/257 |
| 5,740,466 | A | * | 4/1998 | Geldman et al. | 710/5 |
| 5,916,312 | A | * | 6/1999 | Phung et al. | 710/307 |
| 5,918,023 | A | * | 6/1999 | Reeves et al. | 710/301 |

* cited by examiner

*Primary Examiner*—Glenn A. Auve

(57) ABSTRACT

A host control interface for use in interfacing an external host processor with internal control/status registers of an integrated circuit is provided. In accordance with the teachings of the present invention, the control interface selectively couples the integrated circuit with an interchangeable one of a variety of host processor types. In one embodiment, the control interface supports processors having a multiplexed address/data port as well as processors having separate address and data ports. Similarly, in one embodiment, the control interface supports processors utilizing a transfer start indication signal in cooperation with a read/write signal, as well as processors utilizing separate read/write strobes.

34 Claims, 11 Drawing Sheets

CONFIGURABLE GLUELESS MICROPROCESSOR INTERFACE

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue application for U.S. Pat. No. 6,842,816 issued on Jan. 11, 2005.*

BACKGROUND OF THE INVENTION

1. Field of the Invention

The present invention relates to the field of electronic circuits. More specifically, the present invention relates to a configurable glueless microprocessor interface.

2. Background Information

The Internet may be considered a global network of networks interconnected through countless numbers of network switching devices. These switching devices typically direct and/or route data from transmitting devices logically located within a first datacom/telecom network to receiving devices logically located within one or more additional datacom/telecom networks, regardless of their respective geographic locations. The Internet has undergone remarkable growth in recent years. Whether this rapid growth has resulted in the advancement of network processing technologies, or advancements in network processing technologies have in turn spurred the Internet's rapid growth, the fact remains that modern day network switching devices are continually being called upon to direct greater amounts of increasingly complex data. Accordingly, it is becoming increasingly important that network communications be carried efficiently at high speed across a wide variety of local, regional, and wide area networks, including those comprising the Internet.

When switching or routing network traffic, a need often arises to divert a portion of the data packets being routed/switched onto a particular routing path to perform additional processing (or to drop the packets), or to insert additional packets into the packet streams being received off a routing path. To provide the desired packet diversion and/or insertion functionality, one or more companion processors (also referred to as host processors) are sometimes provided. Basic implementations of these switches/routers typically route all packets through the host processor(s) to enable the host processor(s) to selectively divert some of the packets of selected ones of the various routing paths (for additional processing or dropping the packets), or to selectively inject additional packets into the packet streams of selected ones of the various routing paths. In other more advanced implementations, additional switching/routing resources (such as programmable switching/routing tables) may be employed to facilitate routing of some of the packets of selected ones of the routing paths to the host processor(s) for "processing" ("diversion"), and routing of the packets injected by the host processor(s) onto the routing paths of their selection ("insertion"). In addition to facilitating the diversion and/or insertion of packets, the host interface also allows the host processor to control the operational mode of the device, query the operational status of the device, and gain access to statistics, such as byte and packet counters, required by certain networking standards.

Host processors are often interfaced with network switching devices through various amounts of glue logic. Manufacturers and system integrators choose to utilize certain microprocessor architectures depending upon the specific functionality and features desired. For example, a first type of processor architecture (commonly available from Intel Corp., of Santa Clara, Calif.) uses a separate address and data bus for memory addressing, whereas a second type of processor architecture (commonly available from Motorola Inc., of Schaumburg, Ill.), uses a multiplexed address/data bus. A multiplexed address and data bus allows for a reduced pin count enabling a smaller component package size and therefore lower cost. The downside of a multiplexed address and data bus is that additional clock cycles are required to complete a transaction. For example, an address is typically driven onto the bus on a first clock edge, with the next clock edge signaling the beginning of one or more data phases in which data is to be transferred over the same bus. Separate address and data paths on the other hand dedicate bandwidth to each phase of the data transfer, speeding internal data handling, and resulting in higher system performance. Processors may also differ in the way they signal transactions. For example, certain types of processors utilize a transfer start indication signal in cooperation with a read/write signal to indicate the start of a read/write cycle, whereas other types of processors utilize separate read/write strobes to indicate the start of a read/write cycle.

Typically, network switching devices are designed to operate with host processors having a fixed architecture type. For example, if a network switch were designed to operate in cooperation with an Intel class processor functioning as a host processor, then simple substitution of a Motorola class host processor would not be possible without additional, and perhaps extensive glue logic being added. Accordingly, interoperability amongst processors and network switching devices is limited due to the proprietary signaling requirements of the various processors.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a host control interface for use in interfacing an external host processor with internal control/status registers of an integrated circuit. In accordance with the teachings of the present invention, the control interface selectively couples the integrated circuit with an interchangeable one of a variety of host processor types. In one embodiment, the control interface supports processors having a multiplexed address/data port as well as processors having separate address and data ports. Similarly, in one embodiment, the control interface supports processors utilizing a transfer start indication signal in cooperation with a read/write signal, as well as processors utilizing separate read/write strobes. In the following description, various aspects of the present invention will be described. However, the present invention may be practiced with only some aspects of the present invention. For purposes of explanation, specific numbers, materials and configurations are set forth in order to provide a thorough understanding of the present invention. However, the present invention may be practiced without the specific details. In other instances, well-known features are omitted or simplified in order not to obscure the present invention. Further, the description repeatedly uses the phrase "in one embodiment", which ordinarily does not refer to the same embodiment, although it may.

Figure 1:
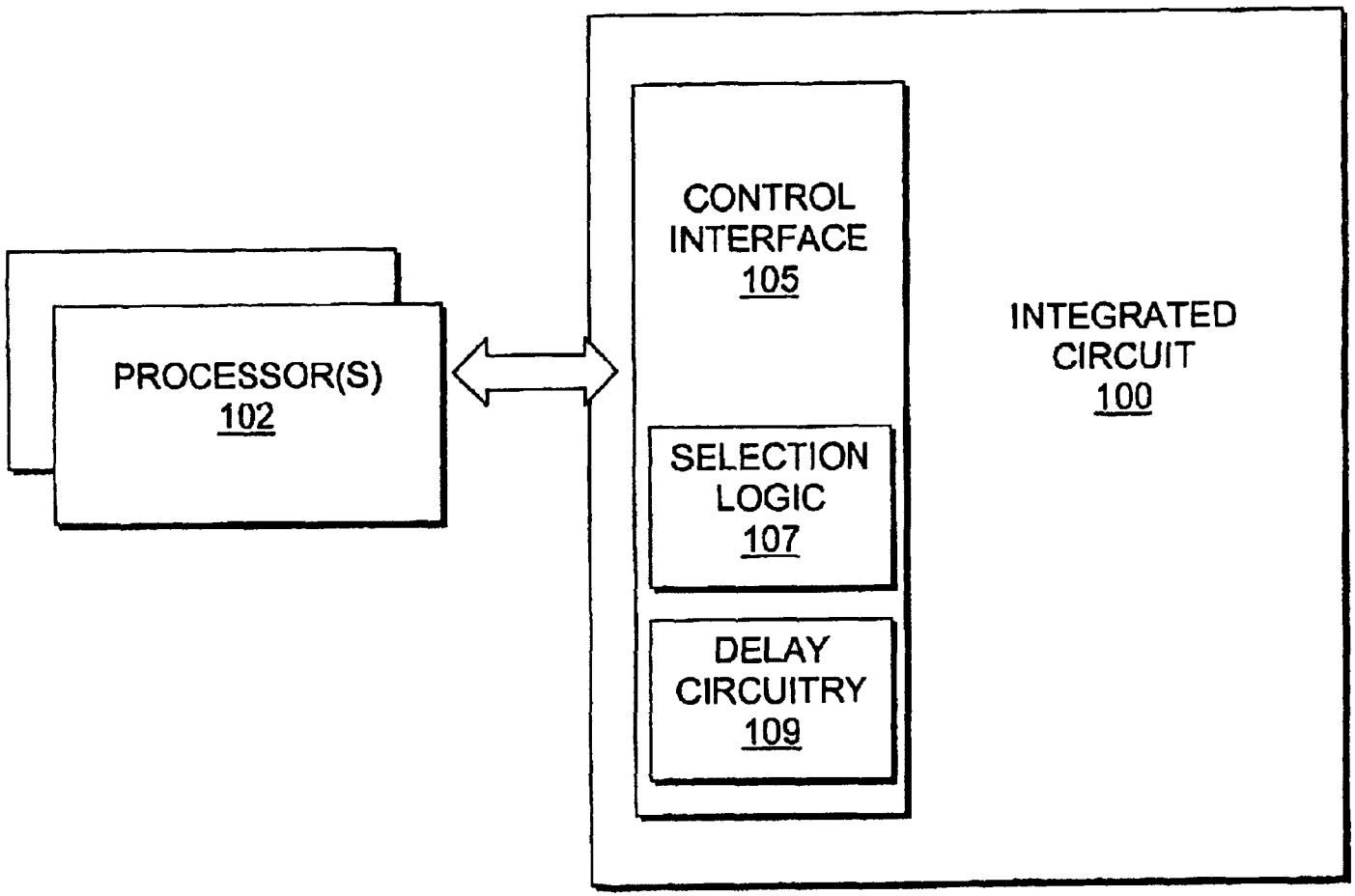
FIG. 1 is a block diagram illustrating an overview of the present invention in accordance with one embodiment.

FIG. 1 is a block diagram illustrating an overview of the present invention, in accordance with one embodiment. As shown, integrated circuit ("IC") 100, includes control interface 105 of the present invention, which selectively couples IC 100 to an interchangeable one or more host processors 102. In one embodiment, control interface 105 is disposed "on chip" with IC 100. Control interface 105 represents a synchronous interface that can be connected to one or more external host processors or equivalent host logic to configure and control a device such as IC 100. Read and write bus transactions driven by a host processor are interpreted by the control interface logic and reformatted into a synchronous read/write protocol connected to various control/status registers within IC 100 (not shown). In one embodiment, control interface 105 utilizes a separate read and write data bus to eliminate bus contention issues.

As will be discussed in further detail below, host processor 102 represents one or more processors having an identified architecture type. In one embodiment, host processor 102 is identified as corresponding to one of a variety of architecture types including those that utilize a multiplexed address and data bus, those that utilize separate address and data buses, those that utilize a transfer start indication signal in cooperation with a read/write indicator, those that utilize separate read and write strobes, and those utilizing various combinations there between. In the illustrated embodiment of the invention, control interface 105 includes mode selection logic 107 to configure control interface 105 to operate in one of a plurality of operational modes based at least in part upon the identified architecture type of host processor 102. In the illustrated embodiment, control interface 105 further includes delay circuitry 109 to provide programmable write latencies based at least in part upon the operating characteristics of host processor 102.

Figure 2:
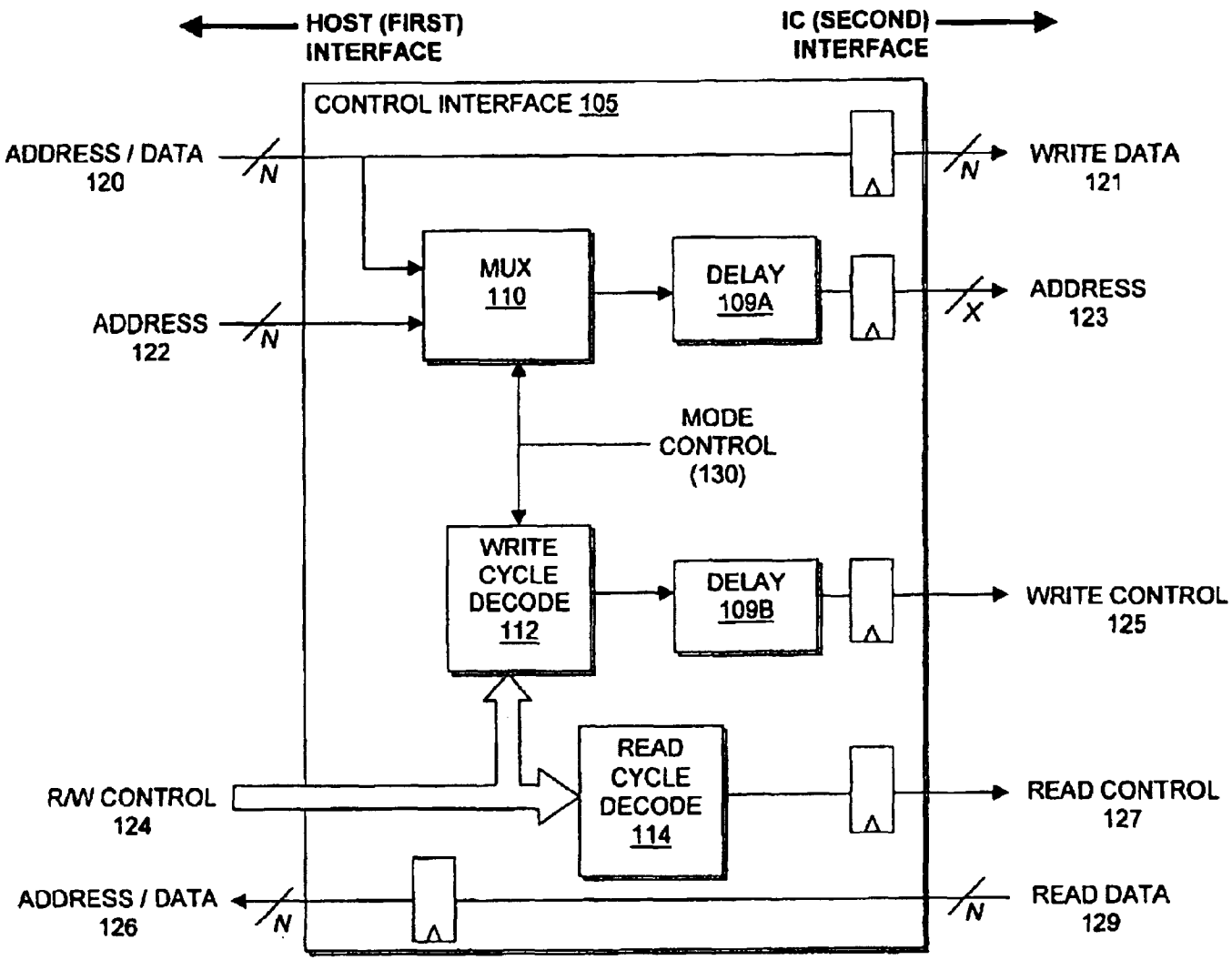
FIG. 2 illustrates a more detailed view of the control interface of FIG. 1, in accordance with one embodiment.

FIG. 2 illustrates a more detailed view of control interface 105 of FIG. 1, in accordance with one embodiment. As illustrated, control interface 105 includes a first interface ("host interface") to be coupled to host processor 102, and a second interface ("IC interface") to be coupled to IC 100. The host interface includes host address/data bus 120, host address bus 122, read/write control signals 124 and read address/data bus 126. The IC interface includes write data bus 121, IC address bus 123, write control signal 125, read control signal 127, and read data bus 129. In one embodiment, IC address bus 123 is a 10-bit address bus that facilitates addressing by control interface 105 of up to 1024 unique register locations within IC 100. It should be noted however that other bus configurations and addressing schemes may be implemented without departing from the spirit and scope of the invention.

As illustrated in FIG. 2, host address/data bus 120 is communicatively coupled to write data bus 121 as well as multiplexer (MUX) 110. In one embodiment, addresses and data received on host address/data bus 120 (i.e. from host processor 102) are driven to write data bus 121 in addition to being provided as input into MUX 110. In addition to host address/data bus 120, host address bus 122 is also coupled to MUX 110 as an input source. In one embodiment, MUX 110 selects information from either host address/data bus 120 or host address bus 122 to pass as output to delay circuitry 109A, based upon the value of at least one mode control signal 130 (to be discussed in further detail below). In one embodiment, the state of mode control signal 130 is determined based upon the architecture type of host processor 102.

Figure 3:
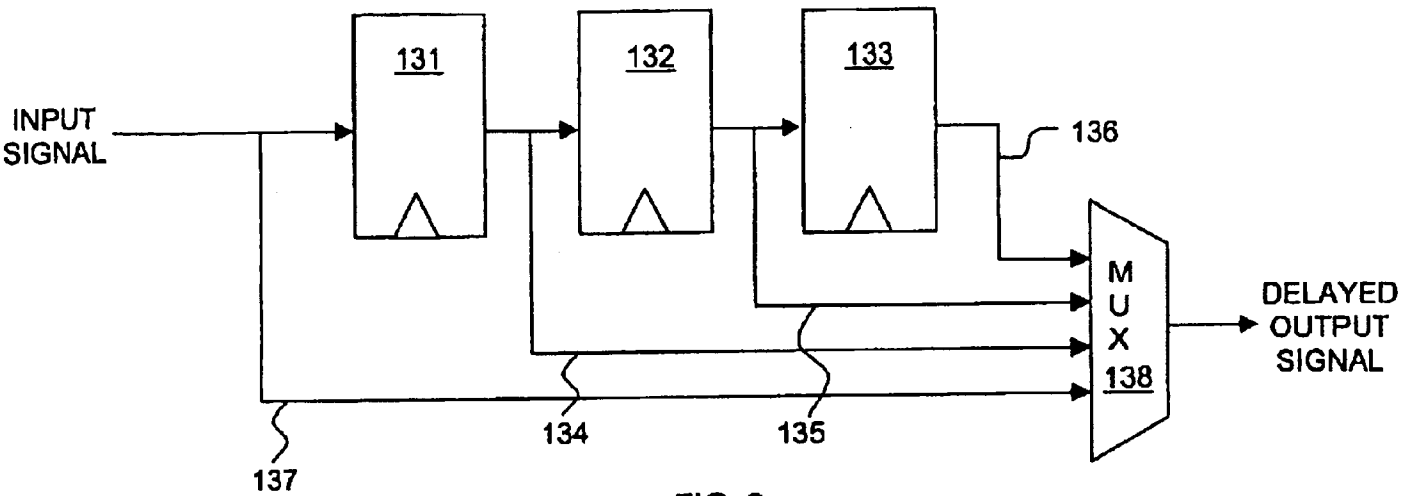
FIG. 3 illustrates one embodiment of delay circuitry of the control interface of FIG. 1.

Delay circuitry 109A (as well as 109B) represents circuitry and/or logic to programmably delay transmission of signals from the host interface to the IC interface in order to interchangeably accommodate various timing requirements of a variety of processors. FIG. 3 illustrates one embodiment of delay circuitry 109A and 109B. In the illustrated embodiment, data registers 131–133 are cascaded together with variously positioned output taps 134–136 being independently connected to MUX 138. In the illustrated embodiment, MUX 138 is controlled by a 2-bit latency control signal, which selects between the variously illustrated output taps based upon a preferred latency determined with respect to processor 102. For example, if output tap 134 were selected via MUX 138, a given input signal into the delay circuitry would be delayed by at least one clock cycle before being output from MUX 138. Similarly, if output tap 135 were to be selected, a given input signal would be delayed by at least two clock cycles before being output from MUX 138. Delay bypass line 137 is additionally provided to circumvent data registers 131–133 altogether, resulting in zero additional latency.

In one embodiment, the amount of latency desired is determined based upon the architecture of host processor 102. For example, in processors utilizing a multiplexed address/data bus, address information is typically driven on the multiplexed bus during a first clock cycle and data is driven on the same bus for at least the following clock cycle. In such cases, it may be desirable to delay the address information one or more cycles so that it is driven on the address bus at the same time valid write data is driven on the data bus. In the illustrated embodiment, delay circuitry 109A and 109B may be programmed to provide zero latency up to a three-cycle delay, however other embodiments may provide a greater or fewer number of delay intervals. In one embodiment, delay circuitry 109A and 109B default to a latency that accounts for the slowest of potential host processor types that may likely be used (i.e. worst case scenario). In one embodiment, a default latency of three cycles is implemented. If a particular processor is capable of functioning with less latency than that stipulated by default, the processor may subsequently adjust the stored latency value(s) by writing a representative value to a particular configuration register provided by integrated circuit 100 or control interface 105 to set the above-mentioned latency control signal.

Reference is once again made to FIG. 2, wherein control interface 105 is shown. In addition to the logic described above, control interface 105 further includes write cycle decode logic 112 and read cycle decode logic 114. Write cycle decode logic 112 receives read/write control signals 124 as input, and outputs write control signal 125 to IC 100 based upon the operational mode specified by mode control signal 130. For example, if mode control signal 130 indicates one mode of operation, write cycle decode logic 112 will output a write control indication on write control line 125 when both a transfer start indication and a write indication are present on read/write control bus 124. Similarly, if mode control signal 130 indicates another mode of operation, write cycle decode will output a write control indication on write control line 125 when a mere write strobe is present. The read cycle decode logic receives read/write control signals 124 as input, and outputs read control signal 127 to IC 100 also based upon the operational mode specified by mode control signal 130. For example, if mode control signal 130 indicates a first mode of operation, read cycle decode will output a read control indication on read control line 127 when both a transfer start indication and a read indication are present on read/write control bus 124. Similarly, if mode control signal 130 indicates a second mode of operation, read cycle decode will output a read control indication on read control line 127 when a mere read strobe is present.

Mode control signal 130 represents a mechanism through which control interface 105 may be programmed to operate in one of a plurality of operational modes in accordance with one of a plurality of signaling protocols and/or processor architectures. In one embodiment, mode control signal 130 represents two control signals implemented in the form of one or more independently programmable binary switches, such as "DIP" switches, that may be manually set to signal a selected one of a plurality of operating modes under which control interface 105 is to operate (e.g. based upon the constitution of processor 102). In an alternative embodiment, mode control signal 130 may be implemented in the form of one or more independently and automatically programmable data registers to cause control interface 105 to operate in a specified operating mode based upon an identified architecture type of processor 102. For example, in the event processor 102 is equipped with one or more connection pins that provide external devices with information identifying one or more aspects of the processor's architecture, mode control signals 130 may be adapted to decode such information and identify an operating mode for control interface 105 based upon that information.

In one embodiment of the invention, mode control signal 130 represents two control signals enabling four independently programmable operating modes for control interface 105. For example, a first control signal is used to select between a first operating mode whereby multiplexed address and data signals are received on host address/data bus 120, and a second operating mode whereby data is received on host address/data bus 120 and address signals are received on separate host address bus 122. Similarly, a second control signal is used to select between a third operating mode whereby a transfer start indicates is used in cooperation with a read/write indication to signify the start of either a read or a write transaction, and a fourth operating mode whereby separate read and write strobes are used to signal the start of a read/write transaction. In accordance with one embodiment of the invention, each mode control signal may be independently set or cleared based upon the architecture of processor 102.

Figure 4:
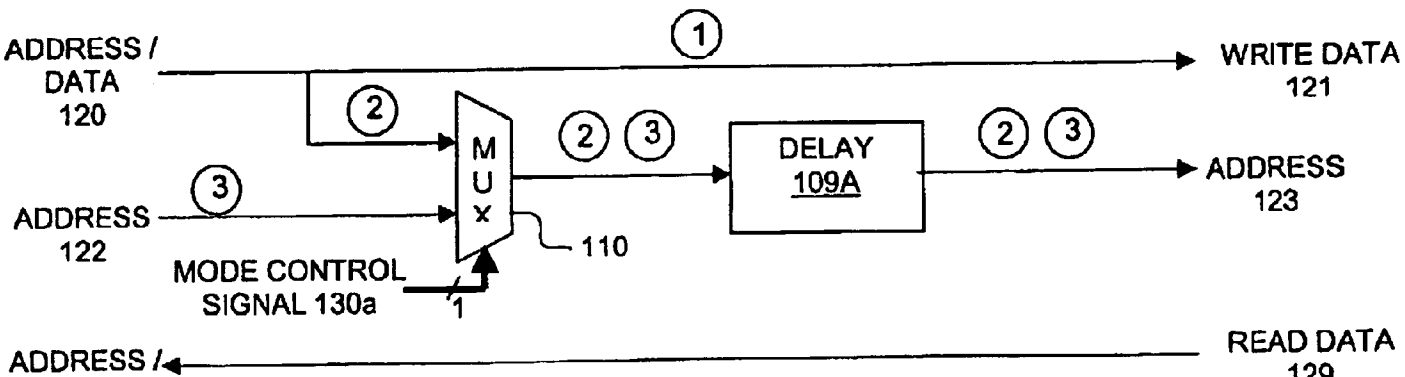
FIG. 4 is a block diagram illustrating two operating modes for the control interface of FIG. 1, in accordance with one embodiment.

FIG. 4 is a block diagram illustrating two operating modes for control interface 105, in accordance with one embodiment. The components depicted in FIG. 4 are functionally identical to their analogues of FIG. 2, but have been redrawn for the purpose of clarity. In FIG. 4, three signal paths have additionally been indicated by the encircled labels of (1), (2), and (3). In accordance with the teachings of the present invention, signal paths (1) and (2) together indicate signal paths that would be followed by data and addresses received from a processor utilizing a multiplexed address and data bus, assuming MUX 110 (and by extension control interface 105) is set via mode control signal 130a to operate in a first operational mode. Signal paths (1) and (3) indicate signal paths that would be followed by data and addresses received from a processor utilizing separate data and address buses, assuming MUX 110 is set via mode control signal 130a to operate in a second operational mode, for example. Accordingly, MUX 110 selects between two signal paths (e.g., (2) and (3)) based at least in part upon the architecture of the host processor.

Figure 5:
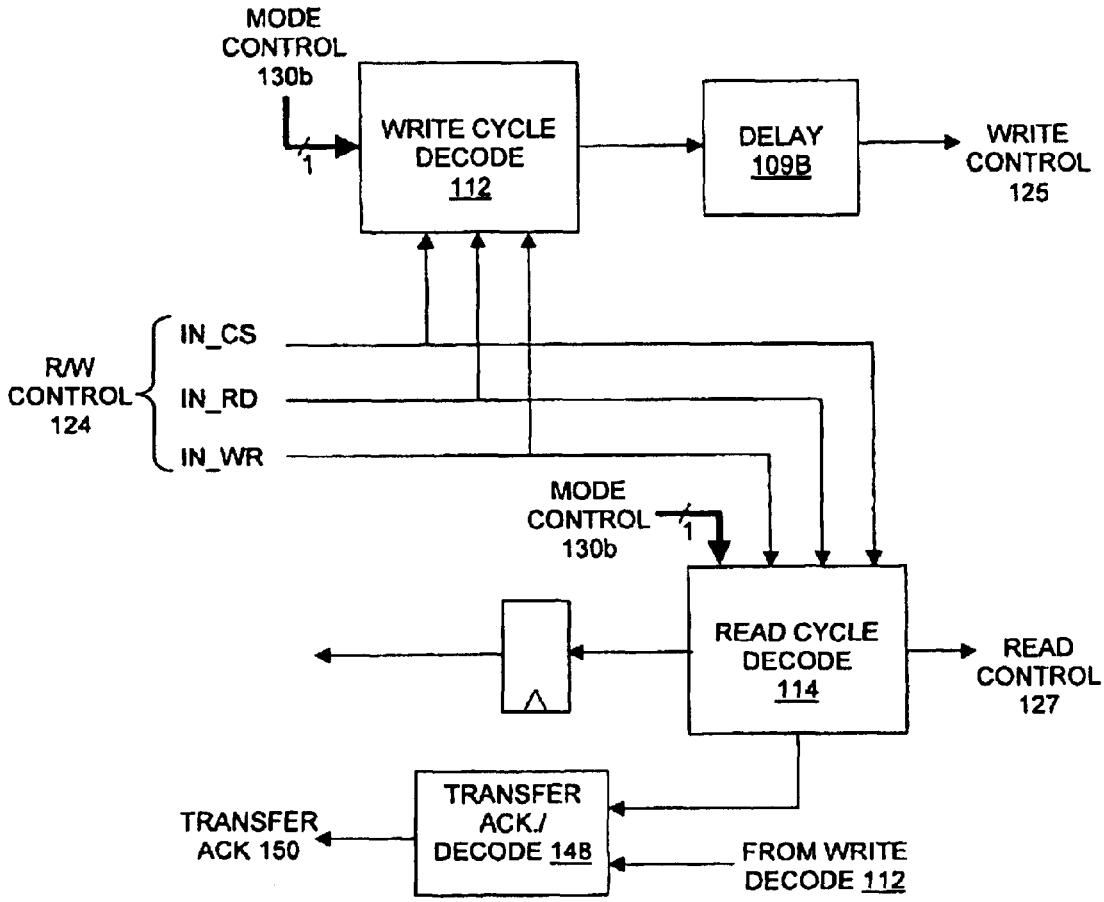
FIG. 5 is a block diagram illustrating two additional operating modes for the control interface of FIG. 1.

FIG. 5 is a block diagram illustrating two additional operating modes for control interface 105. As with FIG. 4, the components depicted in FIG. 5 are functionally identical to their analogues of FIG. 2, but have also been redrawn for the purpose of clarity. In addition to those components shown in FIG. 2 however, FIG. 5 further includes transfer acknowledge decode logic 148, as well as three input signals (IN_CS, IN_RD, IN_WR) corresponding to the generalized read/write control signals 124. In accordance with one embodiment of the invention, mode control signal 130b selects between a third operating mode whereby a transfer start indication is used in cooperation with a read/write indication to signify the start of either a read or a write transaction, and a fourth operating mode whereby separate read and write strobes are used to signal the start of a read/write transaction. In the illustrated embodiment, if mode control signal 130b selects the third operating mode for example, the IN_RD signal line carries transfer start indications and the IN_WR signal line carries read/write indications. Similarly, if mode control signal 130b selects the fourth operating mode for example, the IN_RD signal line carries read strobes and the IN_WR signal line carries write strobes. IN_CS represents a chip select signal line that is useful in the event that one or more additional control interfaces and/or integrated circuits are utilized increasing the addressing requirements of the host processor. Accordingly, IN_CS may be used to enable and disable write cycle decode logic 112 and read cycle decode logic 114. The transfer acknowledge signal 150 indicates to the host processor that a previous read or write operation was acknowledged by IC 100. In one embodiment, transfer acknowledge signal 150 is asserted only when the write latency is greater than zero and when read data is valid on e.g. read bus 129.

Figure 6A:
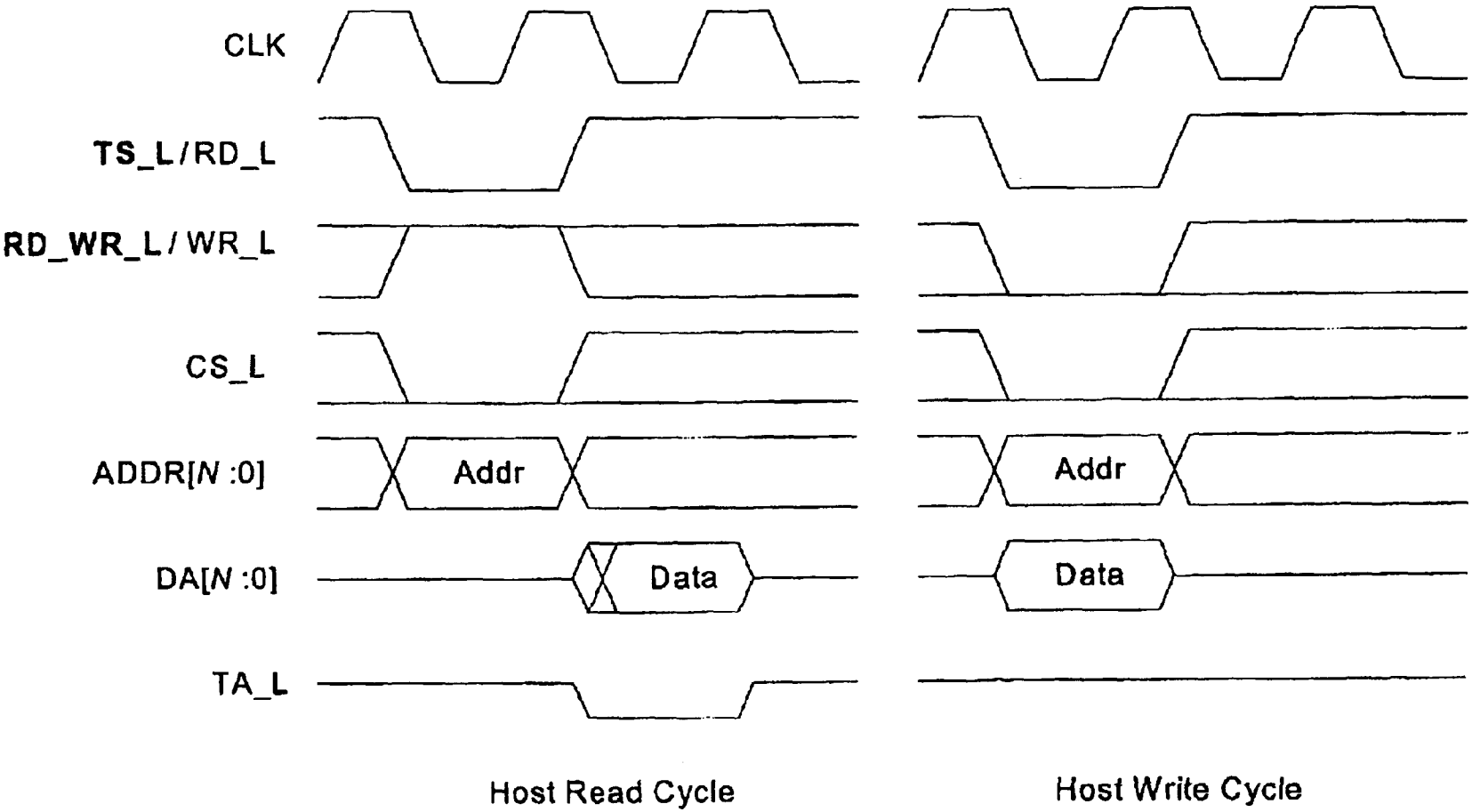
FIGS. 6A–D represent timing diagrams illustrating the various read and write cycle signaling of the host side of control interface 105, in accordance with various operational modes.
Figure 6B:
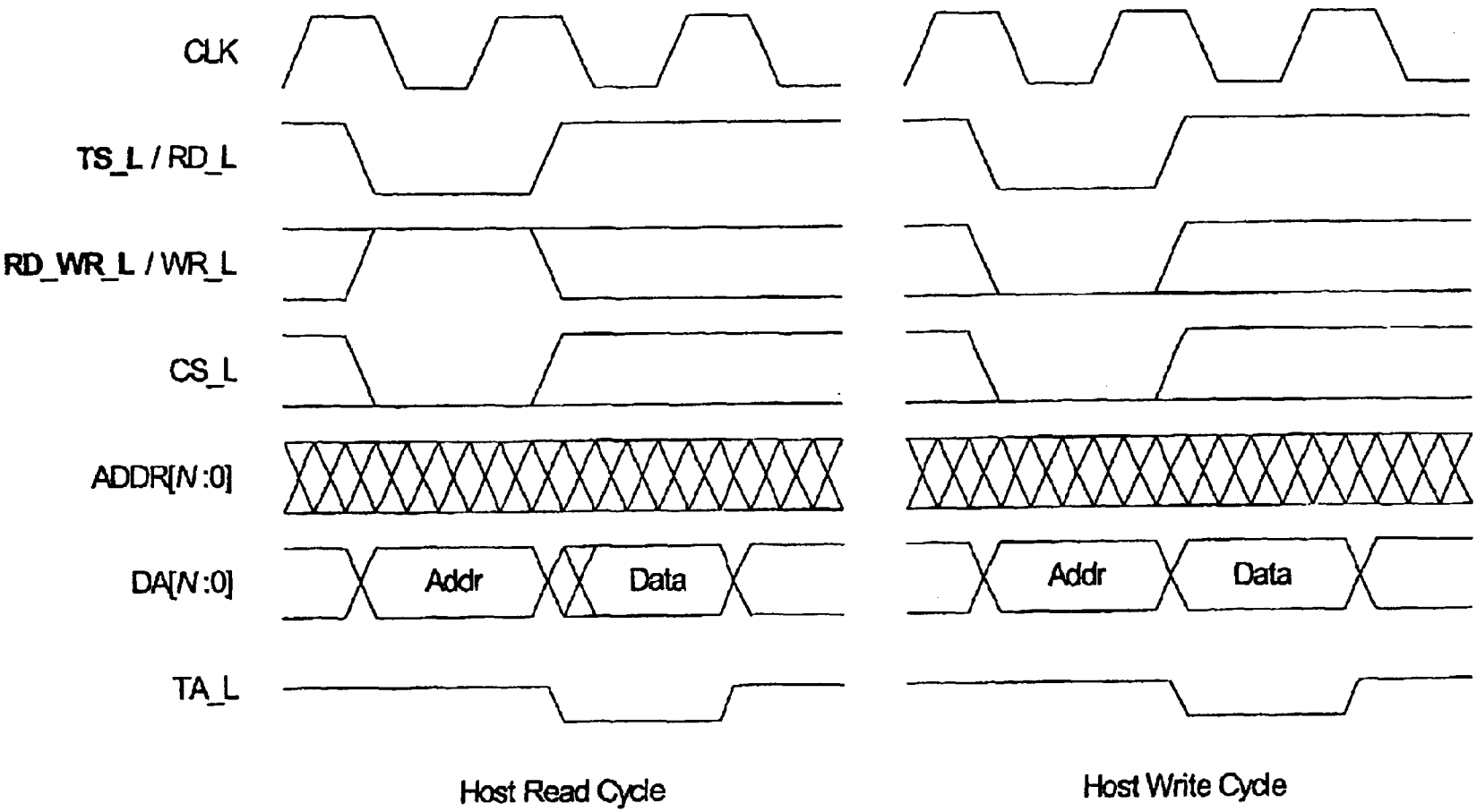
Figure 6C:
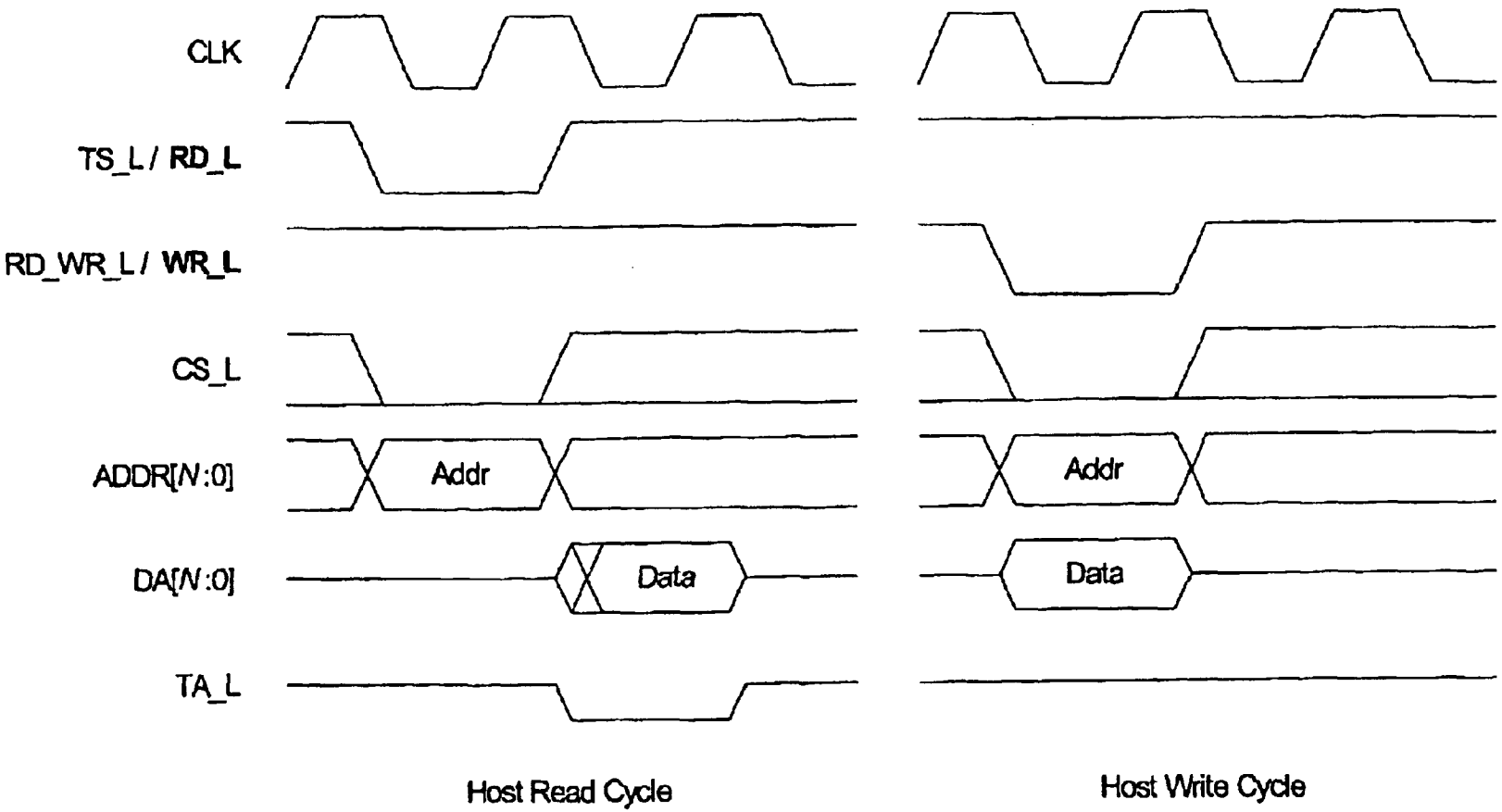
Figure 6D:
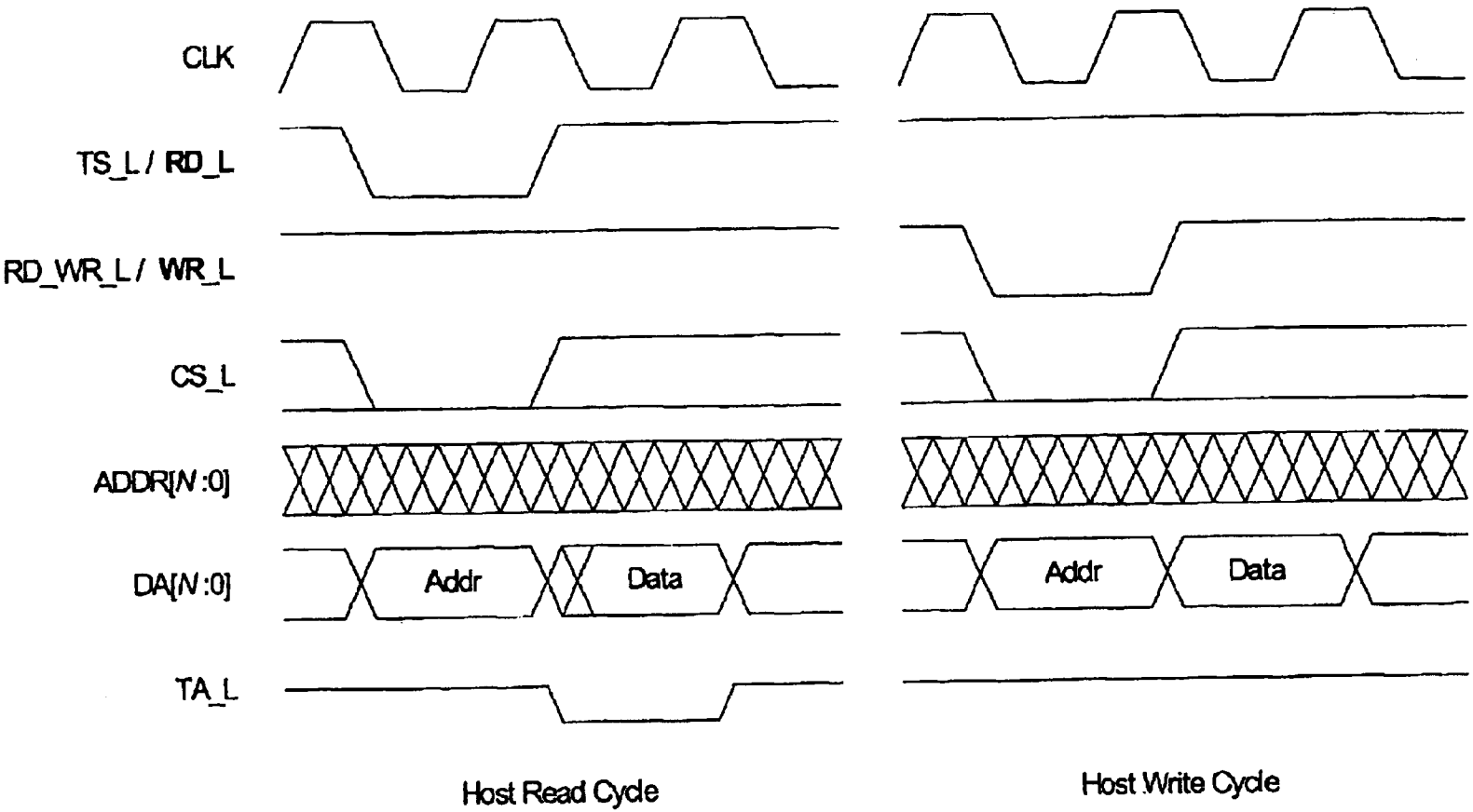

FIGS. 6A–D represent timing diagrams illustrating the various read and write cycle signaling of the host side of control interface 105, in accordance with various operational modes. FIG. 6A is a timing digram illustrating the operation of control interface 105 in accordance with a first operating mode where separate address and data bus is used in conjunction with transfer start and read/write signaling. FIG. 6B is a timing diagram illustrating the operation of control interface 105 in accordance with a second operating mode where a multiplexed address and data bus is used in conjunction with transfer start and read/write signaling. FIG. 6C is a timing diagram illustrating the operation of control interface 105 in accordance with a third operating mode where separate address and data bus is used in conjunction with read/write strobes. FIG. 6D is a timing diagram illustrating the operation of control interface 105 in accordance with a fourth operating mode where a multiplexed address and data bus is used in conjunction with read/write strobes.

Figure 7:
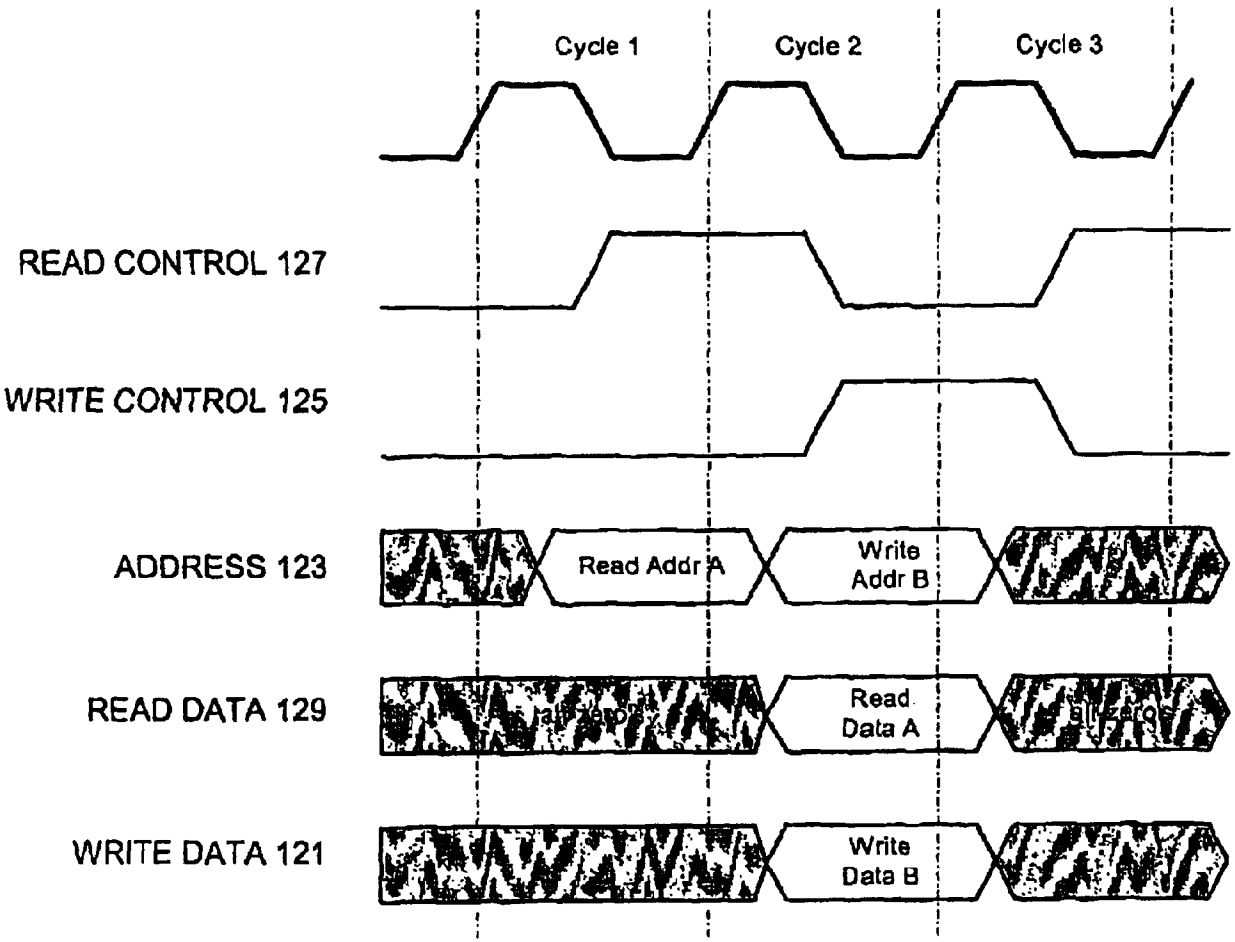
FIG. 7 represents a timing diagram illustrating the various read and write cycle signaling of the host side of control interface 105.

FIG. 7 represents a timing diagram illustrating the various read and write cycle signaling of the IC interface side of control interface 105. From FIG. 7 it can be seen that an address is driven on address bus 123 at the same time read control signal 127 is asserted. During the following clock cycle, the read data is available on read data bus 129. Further, it can be seen that control interface 105 drives a write address on address bus 123 at the same time the write data is driven on write data bus 121. When the address and data are valid, control interface 105 asserts write control signal 125 to begin the transaction.

Sample Applications

Figure 8:
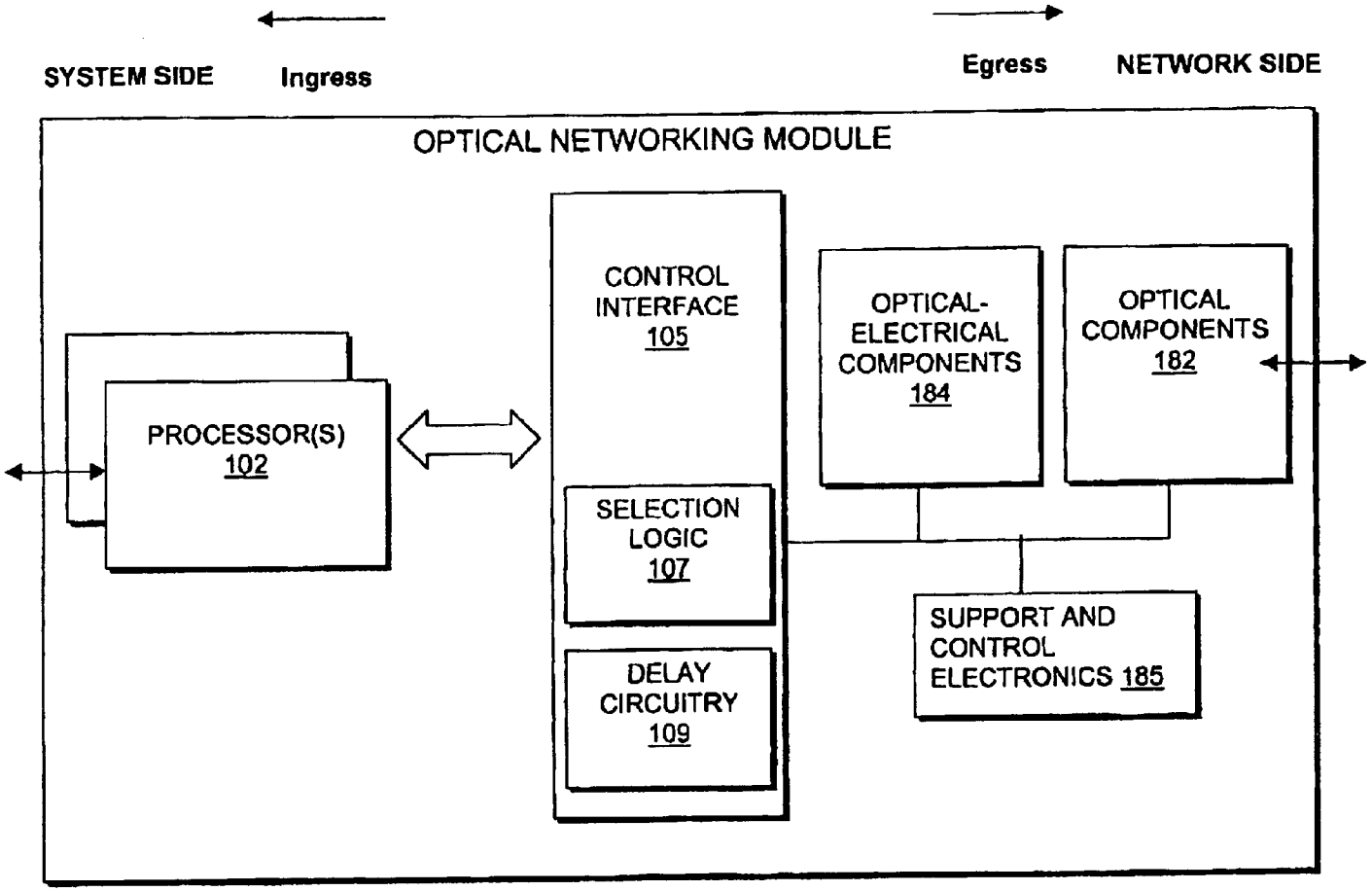
FIGS. 8 and 9 illustrate various example applications of the control interface of the present invention.
Figure 9:
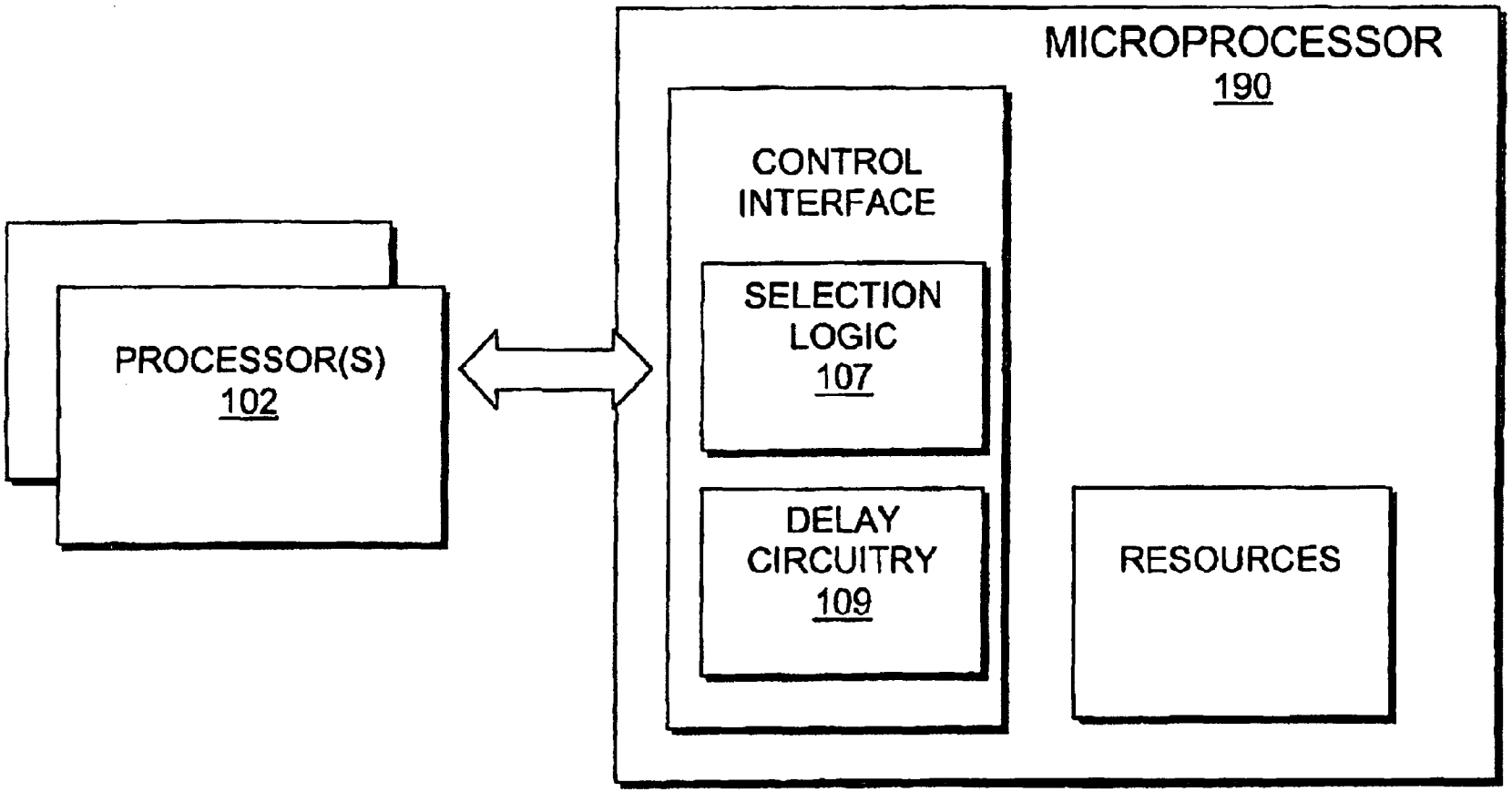

The control interface described above may provide flexible and interchangeable interface functionality to a broad category of devices. FIGS. 8 and 9 illustrate various example applications of the control interface of the present invention. In FIG. 8, an optical networking module is shown including optical-electrical components 184, optical components 182, and support and control electronics 185, which are coupled to host processor 102 via interface logic of the present invention. Optical components 182 are employed to facilitate the sending and receiving of optical signals encoded with data transmitted in accordance with a selected one of a plurality of protocols known in the art. Optical-electrical components 184 are employed to encode the egress data onto the optical signals, and decode the encoded ingress data. In one embodiment, the supported datacom and telecom protocols include but are not limited to SONET/SDH, 10Gbase-LR, 10 Gbase-LW, Ethernet on SONET, Packet on SONET, and so forth. Support control electronics 185 are employed to facilitate management of the various aspects of optical components 182 and optical-electrical components 184. Processor 102 is employed to perform data link and physical sub-layer processing on the egress and ingress data in accordance with a selected one of a plurality of supported datacom/telecom protocols, and to facilitate management of processor 102 itself and optical, optical-electrical components 182 and 184 (through support control electronics 185).

In one embodiment, optical components 182, optical-electrical components 184, support control electronics 185 and processor 102 are encased in a body (not shown) forming a singular optical networking module. In addition to being equipped to provide optical to electrical and electrical to optical conversions, clock and data recovery, and so forth, the integrated optical networking module is also equipped to provide data link and physical sub-layer processing on egress and ingress data selectively for a number of protocols. In one embodiment, processor 102 is interchangeably coupled to the optical networking module, and may be replaced by one or more additional processors of varying architecture types.

FIG. 9 illustrates microprocessor 190 including various resources such as embedded memory, and control interface 105 of the present invention. Microprocessor 190 is shown interchangeably coupled to host processor 102, which through control interface 105, may gain access to the various resources of microprocessor 190 independent of the architectural differences between host processor 102 and microprocessor 190.

Conclusion and Epilogue

Thus, as can be seen from the above descriptions, a novel control interface having selectable operating modes to facilitate interchangeable operation with multiple host processor architectures has been described. While the present invention has been described in terms of the foregoing embodiments, those skilled in the art will recognize that the invention is not limited to those embodiments. The present invention may be practiced with modification and alteration within the spirit and scope of the appended claims. Thus, the description is to be regarded as illustrative instead of restrictive on the present invention.

What is claimed is:

1. An integrated circuit comprising:

switching logic; and a control interface having:

a first interface for connection to an interchangeable one of a first bus of a first processor, and a first and second bus of a second processor, a second interface for connection to a data bus and an address bus of said switching logic, and selection logic coupled to said first and second interfaces and equipped to receive a control signal identifying one of a first control mode to couple said first bus of said first processor to both said data bus and said address bus of said switching logic, and a second control mode to couple said first bus of said second processor to said data bus of said switching logic and to couple said second bus of said second processor to said address bus of said switching logic.

2. The integrated circuit of claim 1, wherein said control interface operates in said first control mode when said first interface is coupled to a multiplexed address and data bus of said first processor.

3. The integrated circuit of claim 1, wherein said control interface operates in said second control mode when said first interface is coupled to separate address and data buses of said second processor.

4. The integrated circuit of claim 1, further comprising:

a read data bus coupled to said first interface and said second interface to transmit multiplexed data and address signals between said switching logic coupled to said second interface and said first processor coupled to said first interface when said control signal identifies said first control mode, and to transmit data signals between said switching logic coupled to said second interface and said second processor coupled to said first interface when said control signal identifies said second control mode.

5. The integrated circuit of claim 1, wherein said control signal is received from an identified one of said first processor and said second processor.

6. An integrated circuit comprising:

switching logic; and a control interface having:

a first interface for connection to an interchangeable one of a first bus of a first processor, and a first and second bus of a second processor, a second interface for connection to a data bus and an address bus of said switching logic, selection logic coupled to said first and second interfaces and equipped to receive a control signal identifying one of a first control mode to couple said first bus of said first processor to both said data bus and said address bus of said switching logic, and a second control mode to couple said first bus of said second processor to said data bus of said switching logic and to couple said second bus of said second processor to said address bus of said switching logic, and delay circuitry to programmably delay transmission of an address from one of said first and second processors to said address bus of said switching logic.

7. The integrated circuit of claim 6, wherein said control interface operates in said first control mode when said first interface is coupled to a multiplexed address and data bus of said first processor.

8. The integrated circuit of claim 6, wherein said control interface operates in said second control mode when said first interface is coupled to separate address and data buses of said second processor.

9. The integrated circuit of claim 6, further comprising:

a read data bus coupled to said first interface and said second interface to transmit multiplexed data and address signals between said switching logic coupled to said second interface and said first processor coupled to said first interface when said control signal identifies said first control mode, and to transmit data signals between said switching logic coupled to said second interface and said second processor coupled to said first interface when said control signal identifies said second control mode.

10. The integrated circuit of claim 6, wherein said control signal is received from an identified on of said first processor and said second processor.

11. A control interface for transmitting signals between an integrated circuit and an identifiable one of at least a first processor type operating in accordance with a first protocol and a second processor type operating in accordance with a second protocol, comprising:

a first signal path to couple one of a first bus of said first processor type and a second bus of said second processor type, with a data bus of said integrated circuit based at least in part upon an identified processor type;

a second signal path to couple said first bus of said first processor type with an address bus of said integrated circuit;

a third signal path to couple a third bus of said second processor type with said address bus of said integrated circuit; and selection logic to select between said second and said third signal paths based at least in part upon said identified processor type.

12. The control interface of claim 11, wherein if said selection logic selects said second signal path then said third signal path is not utilized.

13. The control interface of claim 12, further comprising:

identification logic to identify which of said first processor type and said second processor type is coupled to said control interface.

14. The control interface of claim 11, wherein said first signal path transmits data signals to said integrated circuit, and said second and third signal paths transport address signals to said integrated circuit.

15. A control interface to be coupled to and transmit signals between a logic device and at least one of a first processor operating in accordance with a first protocol and a second processor operating in accordance with a second protocol, comprising:

a first signal line to receive a read strobe signal and a transfer start indication signal;

a second signal line to receive a write strobe signal and a read/write indicator signal to indicate read/write transactions;

first selection logic to signal a write transaction to said logic device if said control interface is coupled to said first processor and said write strobe signal is received on said second signal line, or said control interface is coupled to said second processor and a transfer start indication signal is received on said first signal line and a write transaction is indicated by said read/write indicator signal on said second signal line;

second selection logic to signal a read transaction to said logic device if said control interface is coupled to said first processor and said read strobe signal is received on said first signal line, or said control interface is coupled to said second processor and a transfer start indication signal is received on said first signal line and a read transaction is indicated by said read/write indicator signal on said second signal line; and programmable delay circuitry to dynamically delay said write transaction.

16. The control interface of claim 15, wherein said programmable delay circuitry comprises circuitry to delay said write transaction from one to three clock cycles based at least in part upon timing requirements of said first or second processor.

17. The control interface of claim 15, further comprising:

indicator logic coupled to said first selection logic and said second selection logic to identify whether said control interface is coupled to said first processor or said second processor.

18. An apparatus comprising:

a first interface to couple said apparatus to one of a plurality of host devices and a second interface to couple said apparatus to a second device, said first interface being equipped to interchangeably receive either multiplexed address and data signals from a first bus of a first host device of said plurality of host devices for transmission to an address bus and a data bus of said second device, or address signals from a second bus of a second host device of said plurality of host devices for transmission to said address bus of said second device and data signals from a third bus of said second host device for transmission to said data bus of said second device; and said first interface being further equipped to receive one or more control signals including a read strobe signal and a write strobe signal if said apparatus is coupled to one of said plurality of host devices operating in accordance with a first protocol, and to receive one or more control signals including a transfer start indication signal and a read/write indicator signal if said apparatus is coupled to one of said plurality of host devices operating in accordance with a second protocol.

19. The apparatus of claim 18, wherein said first interface is equipped to interchangeably coupled said apparatus to one of a plurality of processors.

20. An apparatus comprising:

a first interface to couple said apparatus to one of a plurality of host devices and a second interface to couple said apparatus to a second device, said first interface being equipped to interchangeably receive either multiplexed address and data signals from a first bus of a first host device of said plurality of host devices for transmission to an address bus and a data bus of said second device, or address signals from a second bus of a second host device of said plurality of host devices for transmission to said address bus of said second device and data signals from a third bus of said second host device for transmission to said data bus of said second device;

said first interface being further equipped to receive one or more control signals including a read strobe signal and a write strobe signal if said apparatus is coupled to one of said plurality of host devices operating in accordance with a first protocol, and to receive one or more control signals including a transfer start indication signal and a read/write indicator signal if said apparatus is coupled to one of said plurality of host devices operating in accordance with a second protocol;

first delay circuitry to programmably delay address signals to be transmitted to said address bus of said second device; and second delay circuitry to programmably delay write transactions to be transmitted to said second device.

21. The apparatus of claim 20, wherein said first and second delay circuitry is programmed to delay said address signals and said write transactions based at least in part upon operating characteristics of a host device coupled to said first interface.

22. The apparatus of claim 21, wherein said first delay circuitry and said second delay circuitry are programmed to delay an equal number of clock cycles.

23. The apparatus of claim 20, wherein said first interface is equipped to interchangeably coupled said apparatus to one of a plurality of processors.

24. A processor comprising:

internal resources; and interface logic to selectively couple said processor to an interchangeable one of a plurality of host processors, by providing a first interface for connection to a first bus of a first host processor having a first architecture type, or a first and second bus of a second host processor having a second architecture type to provide a selected one of said first and second host processors with access to said resources.

*25. The integrated circuit of claim 1 wherein said control interface is adapted as a synchronous interface.*

*26. The integrated circuit of claim 1, wherein said control interface further includes means for setting said control signal to identify one of said first or second control modes.*

*27. The integrated circuit of claim 1, wherein said control interface further includes means for clearing a setting of said control signal.*

*28. The integrated circuit of claim 6 wherein said control interface is adapted as a synchronous interface.*

*29. The integrated circuit of claim 6, wherein said control interface further includes means for setting said control signal to identify one of said first or second control modes.*

*30. The integrated circuit of claim 6, wherein said control interface further includes means for clearing a setting of said control signal.*

*31. An integrated circuit comprising:*

*a control interface having:*

*a first interface for connection to an interchangeable one of a first bus of a first processor, and a first and second bus of a second processor,*

*a second interface for connection to a data bus and an address bus of switching logic, and*

*selection logic coupled to said first and second interfaces and equipped to receive a control signal identifying one of a first control mode to couple said first bus of said first processor to both said data bus and said address bus of said switching logic, and a second control mode to couple said first bus of said second processor to said data bus of said switching logic and to couple said second bus of said second processor to said address bus of said switching logic.*

*32. The integrated circuit of claim 31 wherein said control interface is adapted as a synchronous interface.*

*33. The integrated circuit of claim 31, wherein said control interface further includes means for setting said control signal to identify one of said first or second control modes.*

*34. The integrated circuit of claim 31, wherein said control interface further includes means for clearing a setting of said control signal.*

* * * * *